3,150,126
PROCESS FOR THE PRODUCTION OF VINYL CAPROLACTAMS
Friedrich August Fries and Karl-Adolf Müller, Marl, Kreis Recklinghausen, Germany, assignors to Esso Research and Engineering Company, a corporation of Delaware
No Drawing. Filed Feb. 7, 1963, Ser. No. 267,878
6 Claims. (Cl. 260—239.3)

It is known to produce N-vinyl caprolactams by reacting caprolactam with acetylene at elevated temperature and pressure. However, in this manner it is impossible to prepare vinyl caprolactams whose vinyl group is attached to a carbon atom.

It has now been found that the vinyl caprolactams not yet described in the literature can be obtained in good yields if 4-vinyl cylohexene-1 is converted, in a manner known per se, to 4-vinyl-1,2-epoxy cyclohexane, the latter is isomerized in known manner to vinyl cyclohexanone, and the vinyl cyclohexanone mixture thus obtained is rearranged in the presence of diluted sulfuric acid and in the absence of solvents with sodium azide or nitrogen hydride to form vinyl caprolactam.

The 4-vinyl cyclohexene-1 serving as the starting material is obtainable by thermal condensation of butadiene as generally known. The epoxidation reaction is performed in known manner, for example by the reaction of 4-vinyl cyclohexene with peracids prepared previously or in situ, such as peracetic acid or perbenzoic acid. In this reaction 25 to 50% hydrogen peroxide in the presence of solvents such as ethyl acetate or mixtures of ethyl acetate with, for example, hydroaromatic hydrocarbons, at temperatures between 0° and 40° C., preferably 30 to 35° C. is used. The epoxidation can also be effected if desired by reacting the cycloolefin with hypochlorous acid followed by treatment with dilute alkali, such as 30 to 40% sodium hydroxide solution or milk of lime. The work-up of the reaction mixture and the purification of the epoxide formed may be effected by fractional distillation.

The 4-vinyl-1,2-epoxy cyclohexane can be isomerized to vinyl cyclohexanone, for example, by passing the gaseous epoxide over catalysts at temperatures between 280° and 350° C., said catalysts being composed of, for example, phosphoric acid or other strong mineral acids or salts thereof in amounts of 10 to 60 wt. percent and of a supporting material, such as alumina, silica gel, or activated carbon. The rearrangement can also be accomplished by heating the epoxide in liquid phase in solvents such as alkylated aromatic hydrocarbons, for example, diethyl benzene, in the presence of halides of metals of the second main group of the Periodic System such as calcium chloride, magnesium iodide, etc., at temperatures of 100° to 120° C. The distillation of the reaction products leads to an isomer mixture consisting of about 80% of 3-vinyl cyclohexanone-1 and about 20% of 4-vinyl cyclohexanone as may be seen from infra red analysis.

The further reaarangement of the ketone with formation of the lactam is effected by a modified Schmidt reaction. Thus far the arrangement according to Schmidt has been carried out in the presence of solvents, such as benzene or chloroform, under the action of concentrated acids, preferably sulfuric acid. However, this procedure involves undesirable side reactions which reduce the yields of the desired lactams. The novel modified rearrangement (according to the present invention) involves the use of diluted sulfuric acid preferably 55 to 80% sulfuric acid, and the absence of solvents. In carrying out the modified rearrangement, the sulfuric acid is employed in an excess of 2 to 20 times, preferably 8 times, the quantity of the vinyl cyclohexanone mixture. The reaction temperature is 0 to 20° C., preferably 10° C. The nitrogen hydride (hydrogen trinitride) required for the reaction is prepared separately or formed in situ, for example by adding gradually sodium azide to the sulfuric acid solution of the vinyl cyclohexanone. The work-up of the reaction mixture can be accomplished for example by neutralization, extraction with a solvent, and distillation whereby an isomer mixture is obtained, said isomer mixture consisting probably of 3-vinyl caprolactam, 4-vinyl caprolactam, and 5-vinyl caprolactam according to gas chromatographic analysis.

Vinyl caprolactam is a valuable starting material for the production of copolymers of acrylonitrile, methacrylic acid, acrylic acid and methacrylic esters. As distinguished from the known copolymers containing N-vinyl caprolactam, the copolymers containing the vinyl caprolactams of the present invention can be dyed particularly easily and evenly.

*Example*

324 grams of pure 4-vinyl cyclohexene-1 boiling at 128° C. are reacted at a temperature of 30 to 40° C. with 76 grams of 25 to 30% peracetic acid (molar ratio of 3:1) dissolved in ethyl acetate. The reaction is complete after one to two hours. The reaction mixture is worked up by distilling off excess vinyl cyclohexene and solvent, and removing the acetic acid by washing. The subsequent distillation of the residue results in 111 grams of 1,2-epoxy-4-vinyl cyclohexane, which corresponds to a yield of 90% of the theoretical. The product boils at 169° C./760 mm. $D_{20}=0.9598$, $n_D^{20}=1.4700$.

30 grams per hour of 1,2-epoxy-4-vinyl cyclohexane (B.P. 169°/760 mm.) are passed at a temperature of 320° C. over a catalyst containing 60% of phosphoric acid on a support of active alumina. With a throughput of 0.3 liter of epoxide per one liter of catalyst and one hour and with a conversion of 60% one obtains 18 grams of a ketone boiling at 78° C./10 mm. $n_D^{20}=1.4680$. CO number: 452 (calculated 452). According to infra red analysis the ketone is a mixture consisting of about 80% 3-vinyl cyclohexanone-1 and about 20% of 4-vinyl cyclohexanone-1.

33 grams of the above vinyl-cyclohexanone mixture are dissolved in 8 times this quantity of 60% sulfuric acid. Then 20 grams of $NaN_3$, i.e. a slight excess, are added at +10° C. When the nitrogen evolution is terminated, the mixture is worked up. Fractional distillation gives 3 grams of vinyl-cyclohexene at 50 to 70° C. and 20 grams of vinyl caprolactam at 113 to 120° C./10 mm. This corresponds to a yield of 60% of the theoretical. $n_D^{20}=1.5068$. According to gas chromatographic analysis the vinyl caprolactam obtained consists of 3 isomers, probably 3-vinyl caprolactam, 4-vinyl caprolactam, and 5-vinyl caprolactam.

It is to be understood that this invention is not limited to the specific example, which has been offered merely as an illustration, and that modifications may be made without departing from the spirit of this invention.

What is claimed is:
1. Process for preparing vinyl-caprolactams which comprises epoxidizing 4-vinyl cyclohexene-1 to 4-vinyl-1,2-epoxy cyclohexane, isomerizing 4-vinyl-1,2-epoxy cyclohexane to a vinyl cyclohexanone mixture, and rearranging the vinyl cyclohexanone mixture thus obtained in the presence of dilute sulfuric acid and in the absence of solvents with a material selected from the group consisting of sodium azide and nitrogen hydride to form vinyl caprolactam.
2. $x$-Vinyl caprolactam wherein $x$ is a number selected from the group consisting of 3, 4 and 5.
3. 3-vinyl caprolactam.
4. 4-vinyl caprolactam.

5. 5-vinyl caprolactam.

6. Process for preparing vinyl caprolactams which comprises reacting 4-vinyl cyclohexene-1 with a peracid in the presence of a solvent at temperatures of 0 to 40° C. to obtain 4-vinyl-1,2-epoxy cyclohexane, isomerizing 4-vinyl-1,2-epoxy cyclohexane in the presence of a catalyst selected from the group consisting of strong mineral acids and salts of strong mineral acids at temperatures of 280 to 350° C. to a mixture of a major portion of 3-vinyl cyclohexanone-1 and a minor portion of 4-vinyl cyclohexanone-1, and contacting the mixture so prepared with 2 to 20 parts by weight of 55 to 80 wt. percent sulfuric acid per weight of vinyl cyclohexanone mixture at temperatures of 0 to 20° C. with sodium azide to form vinyl caprolactams.

No references cited.